Nov. 17, 1953  A. M. SCHWARTZ ET AL  2,659,462
ATTACHMENT FOR PLASTIC ENCLOSURES
Filed Sept. 17, 1948
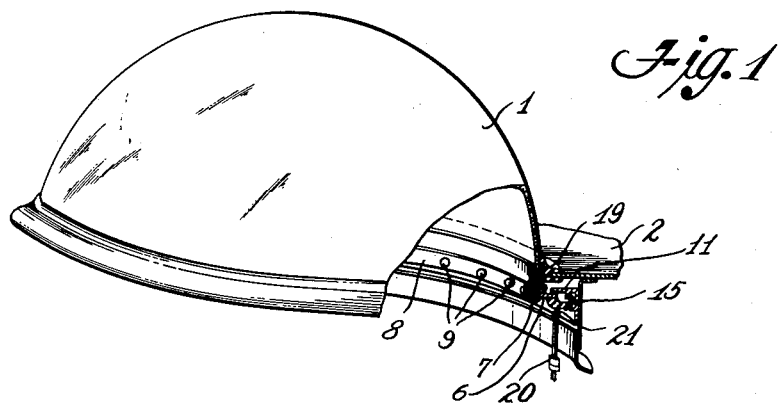
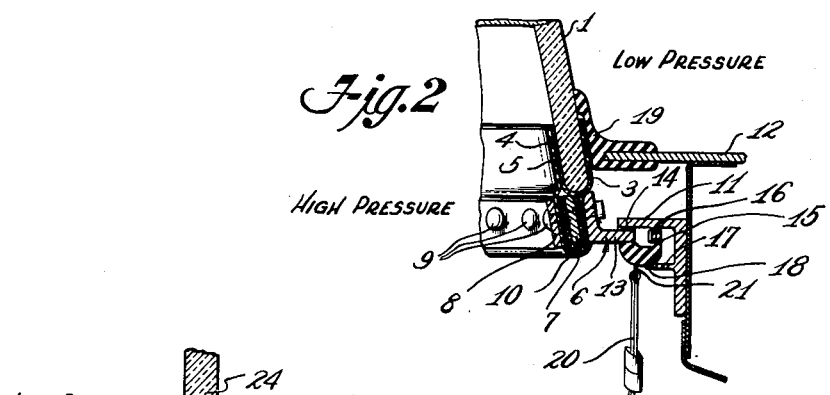
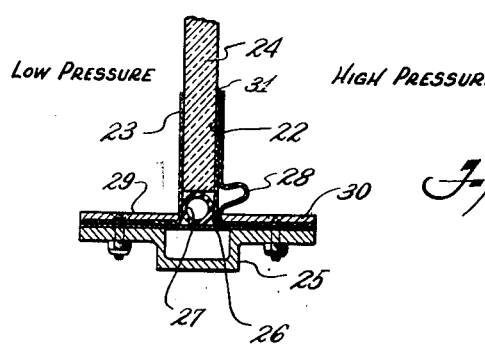
INVENTORS
ALBERT M. SCHWARTZ
JOHN T. WILLOUGHBY
BY
Herbert E. Metcalf
Attorney Patented Nov. 17, 1953

2,659,462

UNITED STATES PATENT OFFICE 2,659,462

ATTACHMENT FOR PLASTIC ENCLOSURES

Albert M. Schwartz, Palos Verdes, and John T. Willoughby, Los Angeles, Calif., assignors to Northrop Aircraft, Inc., Hawthorne, Calif., a corporation of California Application September 17, 1948, Serial No. 49,666

2 Claims. (Cl. 189—64)

This invention relates to joints between plastic and metal, and more particularly to a means and method of attachment of astrodomes, window canopies, turret enclosures, or other transparent "bubbles" which protrude from the otherwise smooth contour of an airplane equipped with internal air pressurization or supercharging above the surrounding atmospheric pressure.

With the advent of higher flying airplanes, constructions have been provided for sealing their cabins airtight and pumping air into them to keep the pressure within the cabin nearer to that of sea level atmospheric pressure than the air pressure at altitude. This is desirable for the physical comfort of passengers and crew, and because of the scarcity of oxygen for breathing in the more rarefied air. During the time the airplane cabin or cockpit is pressurized, the differential pressure between inside and outside air causes large forces to be pushed outwardly, and all airplane installations not directly a part of structural framework are subjected to a tendency to blow out. For example, in several cases, astrodomes have blown off in flight, more than one of these accidents resulting in a person's death. It is, therefore, an object of this invention to provide a strong and reliable means and method of attaching astrodomes, canopies, bubble canopies, or the like to the airplane, so that such parts may be relied upon to hold even under extremes of pressure, and under wide variations of temperature.

Previously, astrodomes, plastic enclosures and the like for installation in airplanes have been formed with a wide flange around the periphery, this flange being clamped or otherwise held between structural retainers forming part of the airframe. This method serves adequately for non-pressurized aircraft, but is not suitable under pressure conditions because of failures due to bending loads imposed at the points where the plastic material leaves the retainers. The present invention eliminates bending loads from the plastic material and gives a flexible attachment by the use of strong fabric strips cemented to each side of the plastic enclosure, with the result that the loads transmitted to the plastic by internal pressure are resisted substantially entirely by the tensile strength of the plastic material.

A very important condition which must be realized is the fact that the thermal expansion rate of the plastic enclosure is much greater than that of the metals comprising the structure of the cutout where the plastic enclosure is attached. Therefore, the attachment means between the enclosure and the metal structure should be flexible not only from a bending standpoint but also in shear, so that excessive thermal stresses will not result from the extreme temperature variations to which the assembly is exposed.

Several applications of this flexible fabric method of the present invention have been successfully used, the one herein described in detail being a preferred type of attachment of a navigator's astrodome to an airframe. However, the invention is not limited to the embodiment herein described, as various forms may be adopted within the scope of the appended claims.

In the drawings:

Figure 1 is a perspective view showing a complete astrodome assembly with part of the side cut away exposing the attachment.

Figure 2 is an enlarged view of the cut-away portion of Figure 1, showing in cross-section the details of one preferred form of astrodome attachment and installation in the airplane.

Figure 3 is a cross-sectional view showing in detail another embodiment of the invention.

The transparent plastic astrodome 1 is approximately a hemisphere, the dome part of which protrudes from the top of the airplane fuselage or body section 2, for the purpose of giving a crew member vision of the surroundings for navigation, for example.

A strip of nylon fabric about four inches wide is positioned to form an exterior web 3 lapping over and being cemented around, the entire outside bottom portion of the astrodome 1 adjacent the edge thereof. A similar nylon web 4 is cemented around the inside of the astrodome, each web extending over the plastic on a strip about one inch wide around the astrodome, and extending beyond the edge for the remainder of the web's width.

While there are a number of procedures suitable for cementing the nylon webs to the plastic material, a preferred method will be described in detail. When a methacrylate sheet is used for the astrodome a resorcinol-formaldehyde cement has been found satisfactory, several makes being found on the market sold under various trade names. Only one web is cemented at a time, and the mating surfaces of both plastic and web are cleaned with naphtha. A light brush coat of the cement is simultaneously applied to both of the mating surfaces, with the cement thinned with denatured alcohol if desired. This coat is allowed to dry for two hours.

A thin coat of normally undiluted cement is then applied to the surfaces, the cement being permitted to dry 40 minutes. The surfaces are then carefully pressed together and the joint is placed under continued pressure by suitable rings and C-clamps. This pressure is maintained overnight and the other web may then be cemented in a similar manner. After both webs are cemented, a synthetic rubber seal strip 5 about two inches wide is attached with rubber cement to the interior nylon web 4 for the same distance as the web is attached to the astrodome. This seal is to prevent air leakage through the nylon webs.

The lower edges of the nylon webs 3 and 4 are then brought together immediately under the center of the astrodome edge, where they are rubber-cemented together between a flanged metal ring 6 on the outside and a central metal retainer 7 on the inside. These rings have upper edges curved to fit the inturning webs. Next, the combined nylon webs are preferably folded up and rubber-cemented along the inside of the central retainer 7, the rubber seal 5 is pulled down and rubber-cemented to the nylon, and an inside metal retainer 8 is rubber-cemented to the rubber seal 5. Rivets 9 are then installed through the layers of metal retainers, rubber seal, folds of nylon fabric, and flanged ring, to secure the nylon to the attaching parts. Finally, a coat of sealing compound 10 is preferably applied to the bottom of the retainers and nylon webs around the astrodome.

The astrodome assembly as described is now complete and ready to install in the airplane. A circular metal bracket 11 is securely attached to the airplane structure near the outside skin 12. The inside diameter of the bracket 11 is smaller than that of lateral extension 13 of the flanged ring 6, so that when the astrodome is installed from inside the airplane the flanged ring 6 will bear against a sealing gasket 14 on the bottom surface of the bracket 11 so that the astrodome cannot be forced through the opening by internal pressure.

The astrodome assembly is held in place against the bracket 11 by a circular rubber retainer 15 which is U-shaped in cross-section, the outer leg of the U being thin and the inner leg relatively thick. The outer leg fits behind a vertical lip 16 of the bracket 11, and the inner leg supports the astrodome flanged ring 6 against the bracket 11. The rubber retainer 15 is supported by a horizontal flange 17 of the bracket, which flange contacts a ridge 18 on the bottom of the retainer 15. The space between the astrodome 1 and the airplane outside skin 12 is furnished with a rubber weather seal 19 which fits over the edge of the skin cutout portion and bears against the outer surface of the astrodome just above the skin level.

Emergency astrodome removal provisions consist of a release thong 20 attached by a cotter pin 21 through the center of the rubber retainer 15. When pulled, the release thong 20 will remove the rubber retainer 15 and allow the astrodome to drop inwardly.

Another embodiment of this invention is shown in Figure 3 wherein a large canopy attachment is shown.

In Figure 3, the interior and exterior nylon webs 22 and 23 are preferably cemented to the plastic enclosure 24 in the same manner as described above, but the assembly is then attached to the airplane structure in a different manner as follows: A sill 25 is bolted in place on the airframe around the enclosure opening, and a metal filler strip 26 is placed on top of the sill 25 with a coat of sealing compound between the two. A rubber tube 27 is rubber-cemented to the bottom edge of the enclosure 24 along its entire circumference. This tube 27 will act as a cushion to absorb shocks and reduce vibration between the enclosure 24 and filler strip 26 which is rigidly attached to the airplane structure.

The enclosure is now lowered onto the filler strip 26 and sill 25. Each nylon web is turned outwardly from the enclosure edge and rubber-cemented to the filler strip 26. A rubberized fabric sealing strip 28 about three inches wide is then placed over the interior nylon web 22 with its inner edge flush with the inner edge of the sill 25. Metal retainers 29 and 30 are installed over each respective nylon web and bolted through to the sill. The inner ends of the retainers are rounded to prevent a sharp bend in the nylon. This operation is done while the rubber cement on the nylon and filler strip is still wet, and the nylon webs are pulled into position so as to remove all wrinkles, but not tightly enough to compress the rubber tube 27. The sealing strip 28 is now rubber-cemented to the interior nylon web 22, and a small fillet 31 of sealer is applied to the top of the interior nylon web. Sealing compound is also preferably applied to the exterior nylon web to seal the pores of the fabric against the entrance of water.

In both instances described above, when supercharged cabin air pressure is exerted on the inside of the enclosures, the force is resisted substantially equally at all points around the dome attachment because of the flexibility of the nylon webs 3, 4, 22 and 23. Therefore, no particular part or section adjacent the attachment edge is subject to high local breaking stresses, a condition which might cause failure, and which might exist in a rigid attachment of the plastic to the airframe.

It will be noted that in the above described embodiments of the present invention, the flexibility of the nylon webs 3 and 4, or 22 and 23, and the concentricity of the joint, i. e., the fact that each nylon web is the same distance from the center line of the plastic material of the enclosure, permit only tensile stresses to be applied to the enclosure, thus eliminating substantially all bending stresses and stress concentrations from the plastic. Substantially all bending stresses are imposed upon metal parts, i. e., the flanged ring 6 in Figure 2 and the retainers 29 and 30 in Figure 3. Bending stresses induced in the plastic material of the enclosure by internal pressure in the case of a non-concentric joint are very high and may cause failure. On the other hand, the tensile stresses produced in the case of a concentric joint are not great and can be readily sustained by the methacrylate enclosure material. Because of this, the present attachment is much stronger than those which place the plastic under bending stresses.

Perhaps the most important advantage of the method of attachment described herein lies in the fact that substantially all thermal stresses are eliminated. This is accomplished because the attachment fabric, nylon in these instances, is a woven material, and, therefore, besides its other desirable characteristics, is flexible in shear as well as in bending, and remains flexible at low temperatures. That is, the attached edges of the enclosure 24 can expand and move at right angles relative to the attachment line on the structure without materially stressing the relatively brittle portion of the plastic sheet adjacent the attachment line on the structure. As plastic material and the rigid metal structure to which the enclosure is attached have greatly differing coefficients of expansion when heated or cooled, any tendency of the enclosure to change shape due to thermal effects can be cumulative with the tendency to change shape caused by the internal pressurization. The movement of the sheet edges permitted by the flexible nylon edge attachment prevents appreciable or excessive combined pressure and thermal stresses from being transmitted to the plastic adjacent the edges of the enclosure. This elimination of thermal stresses as well as the stresses due to pressurization is an extremely important feature since modern aircraft are subjected to very high temperature differentials, from maximum daytime ground temperatures to as low as −65° F.

In actual tests of a particular embodiment utilizing the present invention wherein a plastic astrodome $\frac{5}{16}$ inch thick and 22 inches in diameter was mounted in a rigid structure, the astrodome withstood 44 p. s. i. internal pressure without showing any signs of attachment failure. Since the normal present day pressurization of airplane cabins does not exceed 8 or 10 p. s. i. differential pressure even in military aircraft, the attachment of the present invention provides an extremely high factor of safety against blow out.

While the present invention has been described as applied to the positioning of plastic material to resist stresses caused by differential pressures, it will be obvious to those skilled in the art that the invention can have many other uses where it is desirable that a stress be applied to the plastic material in tension rather than in a bending direction.

From the above description it will be apparent that there is thus provided a device of the character described possessing the particular features of advantage before enumerated as desirable, but which obviously is susceptible of modification in its form, proportions, detail construction and arrangement of parts without departing from the principle involved of sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

What is claimed is:

1. In combination with a wall of a pressure chamber having an aperture therein, a transparent dome having a peripheral sheet portion adjacent to the edge thereof positioned over the marginal edge portion of said wall bounding said aperture and extending substantially perpendicularly outwardly from said wall, said dome edge being spaced outwardly from said wall portion, two webs of nylon fabric attached respectively to the inner and outer surface of said dome adjacent to its edge and extending beyond said edge around the entire extent thereof, means for attaching said webs to said wall portions beyond said dome edge to close the space therebetween, said webs being aligned substantially parallel to the extent of said sheet portion, whereby substantially only tensile stresses are imparted to said sheet portion adjacent to said dome edge when said chamber is internally pressurized, said space between said dome edge and said wall portion being several times the combined thickness of said webs, whereby appreciable lateral thermal expansion of said dome edge relative to said wall can occur, and an elastic cushion member for said dome within the space bounded by said dome edge, said webs, and said wall portions.

2. Combination in accordance with claim 1, wherein the webs each have an out-turned portion perpendicular to their said parallel aligned portions at points substantially beyond the sheet edge, and wherein the web attaching means includes a pair of flat rigid retainers respectively sealed to and clamping said out-turned portion of each web to the said wall portions on each side of the extended center line of the sheet portion to form a concentric joint.

ALBERT M. SCHWARTZ.
JOHN T. WILLOUGHBY.

References Cited in the file of this patent

UNITED STATES PATENTS

| Number | Name | Date |
|---|---|---|
| 2,095,209 | Brownsdon | Oct. 5, 1937 |
| 2,258,724 | Wagner | Oct. 14, 1941 |
| 2,293,656 | McClain | Aug. 18, 1942 |
| 2,382,963 | Dodge | Aug. 21, 1945 |
| 2,405,038 | Jennings | July 30, 1946 |

FOREIGN PATENTS

| Number | Country | Date |
|---|---|---|
| 121,813 | Great Britain | Jan. 2, 1919 |